(12) United States Patent
McLeod

(10) Patent No.: US 10,987,761 B2
(45) Date of Patent: Apr. 27, 2021

(54) METHOD OF CREATING A BURST GROOVE BY LASER SCORING

(71) Applicant: Elfab Limited, North Shields (GB)

(72) Inventor: Brian McLeod, Cramlington (GB)

(73) Assignee: Elfab Limited, North Shields (GB)

( * ) Notice: Subject to any disclaimer, the term of this patent is extended or adjusted under 35 U.S.C. 154(b) by 321 days.

(21) Appl. No.: 15/951,242

(22) Filed: Apr. 12, 2018

(65) Prior Publication Data

US 2018/0297150 A1   Oct. 18, 2018

(30) Foreign Application Priority Data

Apr. 13, 2017 (GB) .................................. 1705969

(51) Int. Cl.
| | |
|---|---|
| *B23K 26/364* | (2014.01) |
| *B23K 26/0622* | (2014.01) |
| *F16K 17/16* | (2006.01) |
| *F16K 17/40* | (2006.01) |
| *B23K 26/359* | (2014.01) |
| *B23K 101/20* | (2006.01) |

(52) U.S. Cl.
CPC ........ *B23K 26/364* (2015.10); *B23K 26/0622* (2015.10); *B23K 26/359* (2015.10); *F16K 17/16* (2013.01); *F16K 17/403* (2013.01); *B23K 2101/20* (2018.08)

(58) Field of Classification Search
CPC ............... B23K 26/364; B23K 26/359; B23K 26/0622; F16K 17/16; F16K 17/403
See application file for complete search history.

(56) References Cited

U.S. PATENT DOCUMENTS

| | | | | |
|---|---|---|---|---|
| 2002/0090493 | A1* | 7/2002 | Kamada | B23K 26/364 |
| | | | | 428/156 |
| 2009/0242525 | A1* | 10/2009 | O'Brien | B23K 26/16 |
| | | | | 219/121.68 |
| 2010/0140238 | A1* | 6/2010 | Mozley | F16K 17/16 |
| | | | | 219/121.72 |

(Continued)

FOREIGN PATENT DOCUMENTS

| | | | | |
|---|---|---|---|---|
| JP | 03064043 | A * | 3/1991 | ............ B23K 26/40 |
| JP | 2006159747 | A * | 6/2006 | ........... B23K 26/364 |
| WO | 2014141307 | A1 | 9/2014 | |

OTHER PUBLICATIONS

Machine translation of Japan Patent document No. 2006-159,747, Apr. 2020.*

(Continued)

*Primary Examiner* — Geoffrey S Evans
(74) *Attorney, Agent, or Firm* — James H. Ortega; Carstens & Cahoon, LLP

(57) ABSTRACT

A method of creating a burst groove in a burst member is provided. The burst groove following a path, wherein: the groove is created in a plurality of laser scoring stages which are performed in succession to thereby successively increase the depth of the burst groove during each stage; each laser scoring stage involving laser scoring the burst member along at least a portion of the path. The laser scoring in each stage involves laser-energizing a respective region of the burst member with a respective energization width measured perpendicular to the path. In at least one stage the energization width is smaller than the energization width in the immediately preceding stage.

17 Claims, 7 Drawing Sheets

(56) References Cited

U.S. PATENT DOCUMENTS

2014/0116531 A1      5/2014   Walker et al.
2014/0238984 A1*     8/2014   Walker .................... F16K 17/16
                                                             220/89.2
2015/0151900 A1*     6/2015   Henry .................... B65D 83/70
                                                             222/397
2016/0018014 A1*     1/2016   Modena ................. B23K 26/40
                                                             137/68.27
2016/0250714 A1*     9/2016   Zhang ................ B23K 26/0622
                                                             219/121.61

OTHER PUBLICATIONS

European Search Report for application No. EP18166817, dated Sep. 3, 2018, 3 pgs.
International Search Report for application No. GB1705969.2, dated May 17, 2017, 1 pg.

* cited by examiner

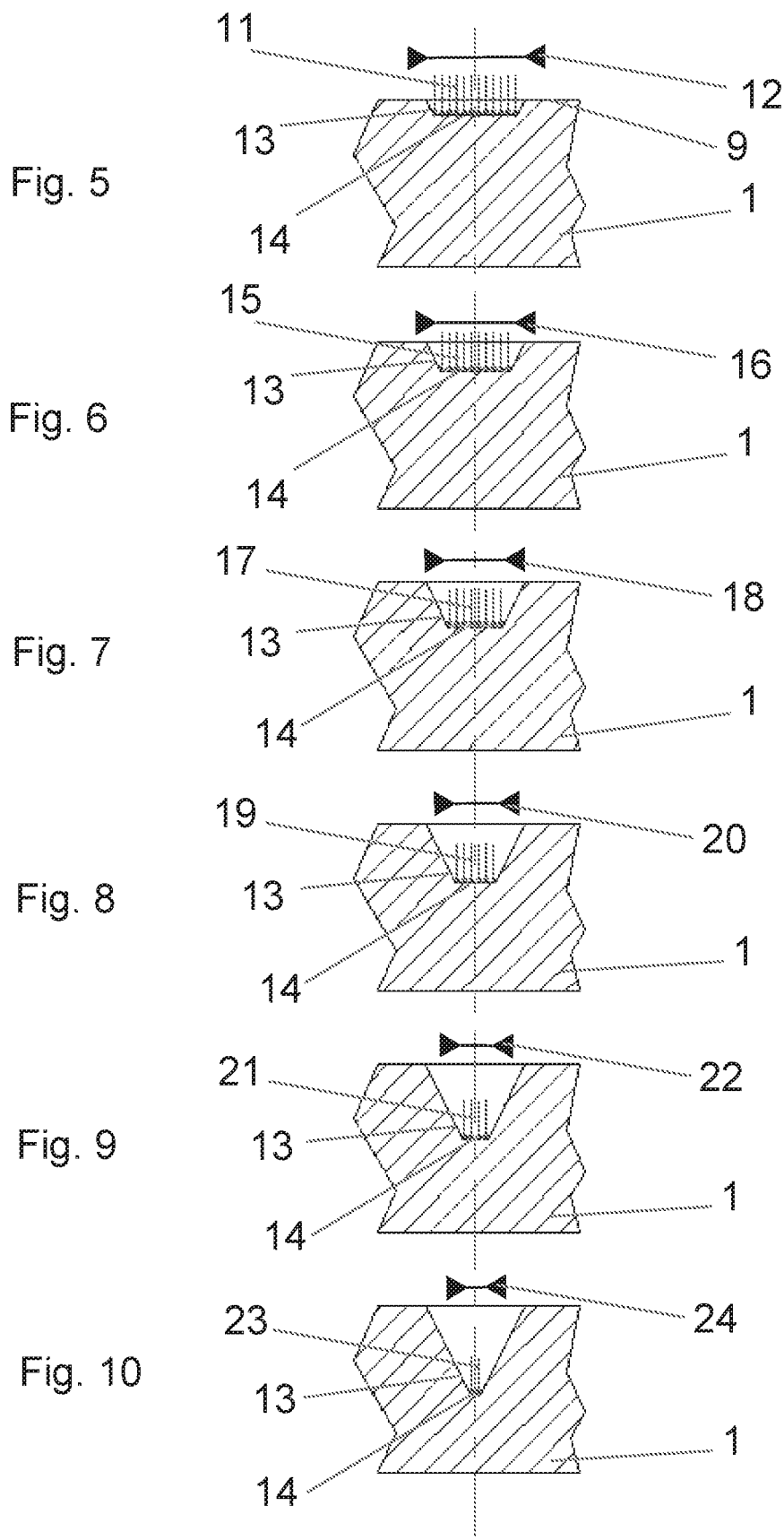

METHOD OF CREATING A BURST GROOVE BY LASER SCORING

RELATED APPLICATION

This application claims priority to Great Britain Application No. 1705969.2, filed on Apr. 13, 2017, which is incorporated herein by reference in its entirety for all purposes.

TECHNICAL FIELD

The present invention relates to a method of creating a burst groove, and more particularly relates to a method of creating a burst groove in a burst member.

BACKGROUND

Hydraulic and/or pneumatic systems use pressurized liquid or gas (hydraulic/pneumatic fluid) to accomplish a variety of tasks. Many different industries use hydraulic/pneumatic systems. For example, hydraulic or pneumatic systems may be used in the following industries: oil and gas, biomass, power generation, chemical, pharmaceutical, food and beverage, storage, intermodal containers, aerospace, defense, automotive, solids and bulk handling, medicine, gas and liquid handling, and others. To satisfy the needs of such a broad range of sectors, hydraulic and pneumatic systems have a broad range of operating characteristics and parameters.

For brevity, throughout the remainder of the application we will refer to "hydraulic fluid" and "hydraulic system". "Hydraulic fluid" is intended to cover gas, liquid, and/or vapor unless explicitly stated otherwise. "Hydraulic system" is intended to cover systems that utilize hydraulic fluid.

In a most general sense, a hydraulic system includes a number of active elements (for example, a piston, a pump, or a tank) interconnected by tubes and/or pipes. Hydraulic fluid is contained under pressure within the elements and the tubes/pipes. A given hydraulic system is able to withstand a certain maximum pressure of the hydraulic fluid within the system. If the pressure in the hydraulic fluid exceeds the maximum pressure then damage to parts of the system may occur. An excessively low pressure within a hydraulic system may also cause damage to the hydraulic system. A hydraulic system may also be damaged when the pressure of the hydraulic fluid is outside a desirable operating range.

In the case of a maximum pressure, typically, the interconnecting tubes/pipes of a hydraulic system are able to withstand a greater pressure before they are damaged than the elements that they interconnect.

Because of this potential for damage to a hydraulic system when the hydraulic fluid has a pressure outside a desirable operating range (which could be an over-pressure or under-pressure condition), a protection mechanism is required that reacts to correct the over- or under-pressure situation before the system is damaged.

Burst members provide one such hydraulic system protection mechanism. A burst member is an element in a hydraulic system that is designed to prevent an over- or under-pressure condition in a hydraulic system from persisting for sufficient time for damage to occur. A burst member generally prevents the flow of hydraulic fluid until a certain pressure in the fluid is reached. When that certain pressure is reached, the pressure differential across the burst member is sufficiently high that the burst member ruptures. This rupture forms an aperture in the burst member, through which the hydraulic fluid can flow, thereby relieving the pressure differential that existed across the burst member and relieving the pressure in the hydraulic fluid. A flow of hydraulic fluid through the ruptured burst member serves to allow the pressure in the hydraulic fluid to return to levels at which the system should not be damaged. In an over-pressure situation, the rupturing of the burst member serves to reduce the pressure in the system, thereby reducing the risk of damage due to the high pressure of the hydraulic fluid. In an under-pressure situation, the rupturing of the burst member increases the pressure in the system, thereby reducing the risk of damage due to the low pressure of the hydraulic fluid.

Typically, a burst member is configured to rupture when there is a certain pressure differential across the burst member. It will be understood that a pressure differential is the difference in pressures between opposing sides of a burst member. On one side of the burst member, the pressure may correspond to the air pressure of the surroundings of the system. Equally, both sides of the burst member may be pressurized relative to the surroundings of the system as a whole. What it is important is the pressure differential across the burst member. The pressure differential may be either positive or negative.

A burst member is configured to rupture at a pre-defined pressure differential value. Being able to control this pre-defined pressure-differential value accurately is important. If the burst member fails to rupture, then damage may occur in the system. On the other hand, if a burst member ruptures when the pressure differential across the burst member is lower than the pre-determined pressure differential, then time is wasted replacing the burst member and re-pressurizing the system, which is undesirable.

Furthermore, because of the catastrophic nature of the rupture of a burst member, it is not possible to produce a burst member with a specific value of pressure differential at which it is guaranteed to burst. Instead, a statistically significant number of identically produced burst members have a range of pressure differential values within which they are expected to rupture. Manufacturers of burst members therefore seek to produce burst members with a narrow range of pressure differential within which a given burst member is expected to rupture.

An ideal burst member therefore has a well-defined (e.g. narrow) specific pressure differential value range within which it should reliably rupture. However, in practice this is difficult to achieve. The pressure differential at which the rupture of a burst member occurs depends on a number of factors. By way of example, these may include: the material of the burst member; the temperature of the burst member, and; the size and shape of the burst member.

A common example of a burst member is a burst disc. A burst disc is generally a circular metal element that is held in position across a vent in a hydraulic system. Under normal conditions (i.e. within the operating range of the burst member), the burst member blocks the vent. When the pressure in the system exceeds a certain value, the burst disc is configured to rupture, thereby opening the vent, which in turn permits the flow of hydraulic fluid through the vent. This flow of hydraulic fluid relieves the pressure in the system. A burst disc may have a variety of shapes and configurations, depending on the intended use and/or pressure rating. For example, a burst disc may be a flat or dome-shaped metal sheet element.

In attempting to produce burst members with a well-defined pressure differential range, a number of methods have been previously proposed.

It is common for manufacturers to form lines of weakness (burst grooves) in the surface of a burst member. These burst grooves attempt to control the pressure differential of rupture for the burst member, and in turn reduce the pressure differential value range within which the burst member is expected to rupture. Burst grooves with a variety of depths, widths and lengths can be formed in an attempt to control the rupture parameters of the burst member.

Mechanically scoring the burst grooves in the surface of a metal burst disc has been proposed. Typically, the burst grooves are formed using a sharp element, for example a knife, which is used to scratch the surface of a burst disc. Forming burst grooves in this manner is difficult to control with high precision, and the consistency of the burst grooves from one burst disc to the next is consequently unreliable.

Using a laser beam to create burst grooves in a layer of resist material that has been applied to burst disc has also been proposed. In this method, a surface of the burst disc is first covered with a resist material. A laser is then used to remove almost completely the resist material along a line on the surface of the burst disc. The burst disc is then electropolished. The absence of laser-removed resist material leaves the metal burst disc exposed to the electropolishing action along a line. The electropolishing partially removes metal along the line defined by the laser, thereby creating a linear recess in the metal of the burst disc. Thus, a burst groove is defined in the surface of the burst disc.

The use of a laser to score directly the surface of a burst disc has also been proposed. In examples of such systems, a laser beam is moved across the surface of a burst disc forming a trench in the surface of the burst disc as it moves.

In such laser scoring of burst discs, laser beams are used to "plough" a single "furrow" forming a burst groove in the burst disc. The parameters of the laser beam control the parameters of the burst groove that is formed. For example, the size and depth of the burst groove is controlled by, for example, the wavelength of the laser, the laser pulse repetition rate, the pulse duration, and the speed of relative motions between the laser and burst disc. The material of the burst member is ablated using the laser, i.e. the action of the laser removes material from the burst member as vapor, without melting or oxidizing material adjacent to the material removed.

In pico-second or nano-second pulsed laser systems, a metal surface of the burst disc is melted by the energy of the laser beam. As the laser beam is moved across the surface of the burst disc, the molten metal can back-fill into the trench formed by the laser. This back filling can impede the formation of the trench in the burst disc by filling in the burst groove, and is accordingly undesirable. This happens because these laser systems do not vaporize the molten metal. Instead, the material is pushed away by the action of the laser beam and solidifies on the sides of the groove, or in the groove after the passage of the laser beam.

When using a pulsed laser system for scoring burst discs there can also be random occurrences of higher energy stray pulses. These stray pulses can pierce through the burst disc entirely, thereby rendering that particular burst disc useless. Even if a stray pulse does not penetrate a burst disc completely, it may still form an unpredictable point of weakness in the burst disc, which in turn could undesirably change the pressure differential at which that particular burst disc will rupture. The occurrence of stray pulses is undesirable, unpredictable and uncontrollable.

When laser scoring thicker materials using fixed power lasers, the scoring process becomes problematic. The surface speed of the beam across the surface of the burst disc has to be reduced to ensure the available energy incident on the surface of the burst member is sufficient to create a melt pool of the metal from which the burst disc is formed. However, this molten metal back-fills the burst groove even as it forms and solidifies, rather than being removed from the burst groove.

A significant problem when laser scoring burst members is how to consistently and repeatedly manufacture burst members with a well-defined pressure differential at which they will rupture. This is especially difficult in thicker burst members.

SUMMARY

It is an object of the present invention to provide an improved method of creating a burst groove in a burst member.

According to the present invention, a method of creating a burst groove in a burst member is provided, the groove following a path, wherein: the groove is created in a plurality of laser scoring stages which are performed in succession to thereby successively increase the depth of the burst groove during each stage; each laser scoring stage involving laser scoring the burst member along at least a portion of the path; wherein the laser scoring in each said stage involves laser-energizing a respective region of said burst member, each said region having a respective energization width measured perpendicular to said path, and wherein in at least one stage said energization width is smaller than the energization width in the immediately preceding stage.

A burst member may include any number of burst grooves, where at least one of the grooves is formed according to the present invention. Alternatively, all of the burst grooves in a burst member with a plurality of burst grooves may be formed according to the present invention.

In the case that a burst member includes a plurality of burst grooves, the burst grooves may be formed in a pattern across the surface of the burst member. The pattern may be a radial pattern, which may splay-out from a central region of the burst member, for example. A burst member may have a concentric pattern of burst grooves. The pattern may be a series of concentric 'C'-shapes (in a plan view).

The path along which a burst groove is formed may have generally any shape. For example, the path may be linear. Such a linear path may have curved and/or straight portions.

A path for a burst groove according to the present invention may be designed using software. The software may be configured to produce instructions to control machinery to dictate the relative movement of a laser and a burst member. The burst groove may be formed along a portion of a path.

The path may be an intangible element. That is to say that the path may be defined only in the sense that it is the route along which a groove will be formed in the burst member. There may, for example, be no physical marking of the burst member to signify the path.

A burst groove in a burst member may have a generally elongate shape. That is to say that the length of the groove may be greater than the width of the groove. In general, a burst groove's long axis follows the path corresponding to the groove.

During each stage of formation of a burst groove, laser energy is used to energize the material of the burst member in an energization region. This energization causes removal of at least some of the energized material from the burst member, thereby increasing the depth of the burst groove. In multiple sequential stages, the depth of the groove is sequentially increased. In this way, a groove can be formed in a burst member with an accurately controlled depth. Furthermore, the laser beam that is used during each scoring stage can be of a lower power than a laser used in a system in which a groove is formed in a single pass of a laser beam across the surface of a burst member.

The accurate control of the groove depth allows for the production of burst members with burst grooves that correspond closely to the design parameters of the burst member. As a result, improvements in the consistency of burst members are possible. In other words, the pressure differential range within which a burst member is expected to rupture can be narrowed for a statistically significant group of burst members manufactured according to the present invention.

During a given stage, the energization region need not be energized across its full extent simultaneously. Indeed, if the energization region is energized by the passage of a laser beam, then the whole of the energization region will not be energized to the same extent at the same time.

The energization region of each stage may also have a generally rectangular shape, with the long axis of the rectangle orientated along the path corresponding to the burst groove.

The energization width being smaller in at least one stage than in an immediately preceding stage means that a cross-sectional profile of a groove formed according to the present invention narrows between the opening of the groove and its base. This narrowing profile means that the pressure differential at which the burst member is expected to rupture can be more accurately controlled. The smaller-width energization region in the later stage may be formed entirely or partially within the higher-width, earlier stage, energization region. A line of symmetry of a later energization region may be coincident with a line of symmetry of the earlier energization region.

The material of the burst member may be ablated from the burst member by the action of the laser beam being incident on the surface of the burst member in the energization region.

When the movement of a laser beam is described, it is to be understood that this encompasses the movement of the laser beam relative to the burst member and/or the movement of the burst member relative to the laser beam. What is important is the relative movement between the burst member and the laser beam.

Preferably, said plurality of laser scoring stages includes a final stage which involves moving a single laser beam along a single laser track.

A track designates the route that a single incident laser beam takes across the burst member. As the incident laser beam moves across the burst member, the incident energy from the laser on the burst member energizes the material of the burst member.

Thereby, the energization of the burst member in the final stage can be as narrow as the width of a single laser beam will allow. The energization width in the final stage may therefore generally correspond to the width of the incident laser beam. This results in a burst groove with a narrow base, which permits a more reliably predictable pressure differential at which the burst member will rupture.

Advantageously, at least one of said plurality of laser scoring stages involves laser scoring the burst member by moving at least one laser beam along a plurality of adjacent and parallel laser tracks.

By moving a laser beam along a plurality of adjacent and parallel tracks the energization width of that stage can be greater than the width of a single laser beam. The energization width in such a stage may be generally equal to the sum of the widths of a single laser beam multiplied by the number of parallel and adjacent tracks. The energization width of a given stage may be proportional to the number of tracks in that stage.

The parallel laser tracks may be sufficiently close together that there is no intervening region of burst member material between a pair of tracks that is not energized by a laser.

The laser tracks may be parallel to one another along only a portion of their respective lengths. The laser tracks may be adjacent to one another along only a portion of their respective lengths.

Conveniently, each of said laser scoring stages involves laser scoring the burst member by moving at least one laser beam along a respective plurality of adjacent and parallel laser tracks.

In this way, each stage involves the use of a plurality of tracks. The number of tracks can be different in each stage. This means that the cross-sectional profile can be controlled by controlling the number of tracks used during each stage. Thus, a specific cross-sectional shape of the burst groove can be achieved. Alternatively, all of the stages of the burst groove may involve the use of more than one track, except for the final stage, which may include only a single track, as described above.

The incremental increase in depth of the burst groove during each stage is smaller than the total depth of the completed burst groove.

Preferably, at least one of said laser scoring stages involves laser scoring the burst member by moving a single laser beam sequentially along said plurality of laser tracks.

In this way, a laser may move sequentially along the tracks corresponding to a given stage. However, it will be appreciated that a laser may score the tracks of a given stage in any order. For example, it is not necessary that a given track be scored immediately after an immediately adjacent track.

The laser may be switched off or otherwise diverted from incidence on the burst member between the movements of the laser along the tracks. Alternatively, the laser may move in one continuous motion, each of the tracks forming a portion of the continuous motion. In this manner, the laser scoring of tracks in a stage can be formed in one continuous motion of a laser beam across the burst member.

Advantageously, at least one of said laser scoring stages involves laser scoring the burst member by simultaneously moving a respective laser beam along each of said plurality of laser tracks.

In this way, the laser tracks during at least one of the laser scoring stages are scored at the same time. In other words, multiple laser beams simultaneously pass along the plurality of tracks corresponding to that stage. Thus, multiple tracks are laser scored simultaneously. It will be appreciated that such a plurality of laser beams may be generated by a corresponding plurality of laser sources. Alternatively, the plurality of laser beams may be formed by splitting a single laser beam from a single source into a plurality of distinct laser beams.

Conveniently, said plurality of laser scoring stages includes at least one stage which involves laser scoring the burst member along fewer tracks than in the immediately preceding stage.

This corresponds to one method of implementing the reduction in energization width between two stages. As discussed above, the energization width during a given stage may generally correspond to the number of adjacent and parallel tracks in that stage. Thus, by having fewer tracks in a subsequent stage, the energization width in that subsequent stage is correspondingly smaller that the energization width in the preceding stage (during which a greater number of tracks is used).

Preferably, said plurality of laser scoring stages includes at least one stage which involves laser scoring the burst member along fewer tracks than in each preceding stage.

Advantageously, said plurality of stages includes an initial stage and a plurality of subsequent stages, each of said subsequent stages involving laser scoring the burst member along fewer tracks than in the respective immediately preceding stage.

In this way, the energization width of the laser scoring can decrease with each successive stage. Thus, the width of the completed burst groove can taper from a maximum width at the surface of the burst member (i.e. at the opening of the burst groove) to a minimum width at the base (i.e. at the bottom of the burst groove). It will be understood that the completed burst groove may have a V-shaped cross-sectional shape. Thus the width of base of the completed burst groove, at least in theory, may tend towards being equal to zero (i.e. pointed).

The final cross-sectional profile may be stepped with each successive stage. Alternatively, the final cross-sectional profile of the burst groove may be smooth-sided. It will be understood by one skilled in the art that the parameters of the laser beam(s) may be controlled such that the final cross sectional profile of the burst groove is smooth-sided, rather than stepped. No specific additional smoothing step may be required. Smooth sides of the completed burst groove are by virtue of the parameters of the laser beam. It may also be important how close the adjacent tracks are to one another in a given stage, and the extent of overlap between tracks in one stages and the tracks in a subsequent stage.

Conveniently, in at least one of said plurality of stages, the positions of the end points of the plurality of tracks are staggered relative to one another.

As discussed above, a track designates the route that a single incident laser beam takes across the burst member. The point at which the laser transitions from being incident on the burst member to not being incident on the burst member corresponds to a track end point. Clearly, a linear track will have two end points, one at each opposed end of the track.

In a given stage, the corresponding plurality of tracks may end in generally the same location. However, it is particularly advantageous that end points of tracks that are adjacent along a portion of their respective lengths are not immediately adjacent to one another. At the end of a laser track, the movement of the laser may stop. If the end point of a track is formed when the movement of the laser stops, the laser beam may linger at its stop point. The point at which the laser may linger corresponds to an end point of a track. The inventors have discovered that having a number of these track end points in close proximity to one another is undesirable. A close proximity of track end points may introduce a weak point in the burst member. This weak point may introduce a degree of unpredictability in the pressure differential at which the burst member should rupture. In turn, the weak point may undesirably widen the pressure differential range within which it is statistically more likely that a burst member may rupture.

To mitigate against the formation of such a weak point, the end points of the tracks of a given stage may be staggered. That is to say, for example, that an imaginary line joining the end points of the tracks in a given stage may not be straight. Alternatively, for example, the imaginary line may indeed be straight, but not perpendicular to the tracks. The end points of directly adjacent tracks may be offset from one another. The positions of the end points may be a sequence of end positions that have a step-wise separation between adjacent end points. The position of the end points may be a repeated sequence of end point positions. The resulting offset of end points may prevent an undesirable weakening of the burst member in a region surrounding the end points of the tracks.

Preferably, said plurality of laser scoring stages includes at least one stage in which said energization width is smaller than the energization width in each preceding stage.

In this way, a number of stages with a first energization width may be formed followed by a number of stages with a second energization width, where the second energization width is smaller than the first energization width. That is to say that there need not be a reduction in the energization width with every successive stage.

Advantageously, said plurality of stages includes an initial stage and a plurality of subsequent stages, wherein in each of said subsequent stages said energization width is smaller than the energization width in the respective immediately preceding stage.

In this way, the energization width can decrease during each successive stage. Thus, the width of the completed burst groove can taper from a maximum width at the surface of the burst member (i.e. at the opening of the burst groove) to a minimum width at the base (i.e. at the bottom) of the burst groove. It will be understood that the completed burst groove may have a V-shaped cross-sectional shape. Thus the width of base of the completed burst groove, at least in theory, may tend towards being equal to zero. Nevertheless, it will be noted that the width of the completed burst groove tapers between the width of the burst groove at the surface of the burst member and the width of the burst groove at the base of the burst groove.

The final cross-sectional profile may be stepped with each successive stage. Alternatively, the final cross-sectional profile of the burst groove may be smooth-sided. It will be understood by one skilled in the art that the parameters of the laser beam may be controlled such that the final cross sectional profile of the burst groove is smooth-sided, rather than stepped. No specific smoothing step may be required. The smooth sides of the completed burst groove are by virtue of the parameters of the laser beam. It may also be important how close the adjacent tracks are to one another in a given stage, and the extent of overlap between tracks in one stages and the tracks in a subsequent stage.

Conveniently, a single laser beam of constant dimensions is used.

The dimensions of the beam may be measured in a convenient way known to those of skill in the art. For example, the Full Width Half Maximum for the beam diameter of a circular beam may be used, or the width at which the beam intensity has fallen to $1/e^2$ of its peak value. The laser beam need not be circular at the point of contact with the surface of the burst member. Alternatively, the beam may be circular.

The average power of the laser may be constant during scoring along all of the laser tracks. The energy density incident on the surface of the burst member may be constant during all of the laser tracks. It will be understood that the laser may be deactivated or otherwise directed away from the burst member between laser tracks. As such, during these times, the incident power on the surface of the burst member from the laser will be zero.

Preferably, a pulsed laser is used.

The laser may be a nano-second laser, a pico-second laser or a femto-second laser, for example.

Advantageously, the burst groove has a cross sectional width that tapers from a maximum width at a surface of the burst member to a minimum width at the base of the groove.

Conveniently, the cross sectional shape of the groove has a flat-bottomed 'V'-shape.

Preferably, the cross sectional shape of the groove has a 'V'-shape.

BRIEF DESCRIPTION OF THE DRAWINGS

So that the invention may be more readily understood, and so that further features thereof may be appreciated, embodiments of the invention will now be described by way of example with reference to the accompanying drawings in which:

FIG. 5 is a cross-section of a portion of a burst member during the formation of a burst groove according to an embodiment of the present invention;

FIG. 6 is a cross-section of a portion of a burst member during the formation of a burst groove according to an embodiment of the present invention;

FIG. 7 is a cross-section of a portion of a burst member during the formation of a burst groove according to an embodiment of the present invention;

FIG. 8 is a cross-section of a portion of a burst member during the formation of a burst groove according to an embodiment of the present invention;

FIG. 9 is a cross-section of a portion of a burst member during the formation of a burst groove according to an embodiment of the present invention;

FIG. 10 is a cross-section of a portion of a burst member during the formation of a burst groove according to an embodiment of the present invention;

DETAILED DESCRIPTION

When used in this specification and claims, the terms "comprises" and "comprising" and variations thereof mean that the specified features, steps or integers are included. The terms are not to be interpreted to exclude the presence of other features, steps or integers.

Figure 1:
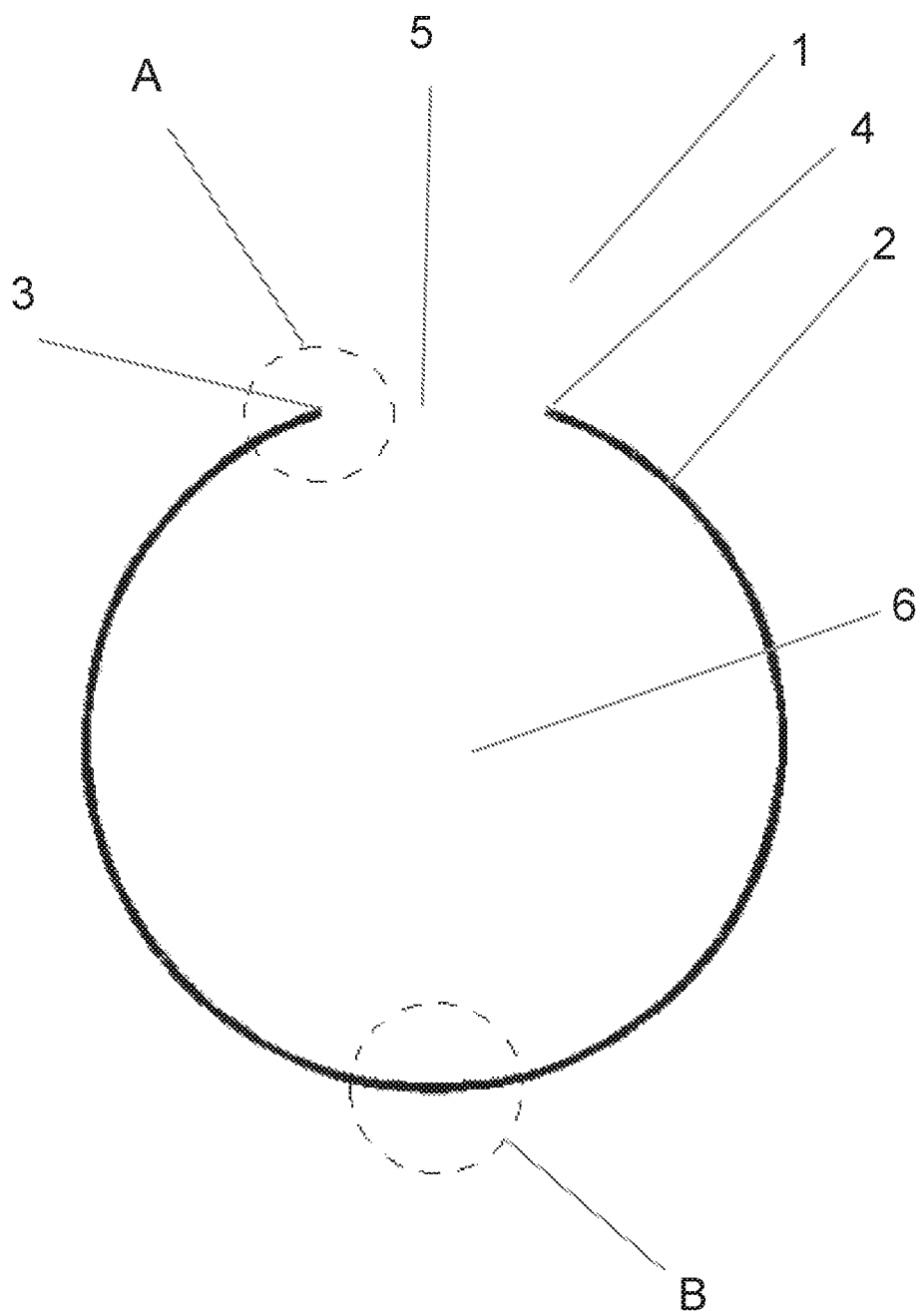
FIG. 1 is plan view of a burst groove formed according to an embodiment of the present invention.

FIG. 1 shows a plan view of part of a burst member 1. A burst groove 2 has been created in the burst member 1 according to an embodiment of the present invention.

The burst groove 2 follows a path. The path, and consequently the burst groove 2 both have a C-shape in plan view. The burst groove 2 consequently has first and second groove ends 3, 4. Between the first and second groove ends 3, 4 of the burst groove 2, there is a connecting region 5 across which no burst groove is formed.

The burst groove 2 generally circumscribes a cover portion 6 of the burst member 1.

In an over- or under-pressure situation, the burst groove 2 is configured to rupture along at least a portion of its length. This rupture allows hydraulic fluid to pass through the burst member, relieving the over- or under pressure situation. The cover portion 6 is configured to open in the manner of a flap, during such an opening, and thereafter, the cover portion 6 remains attached to the remainder of the burst member 1 via the connection region 5. During such an opening, the connecting region 5 effectively acts as a hinge about which the cover portion 6 opens.

Figure 2:
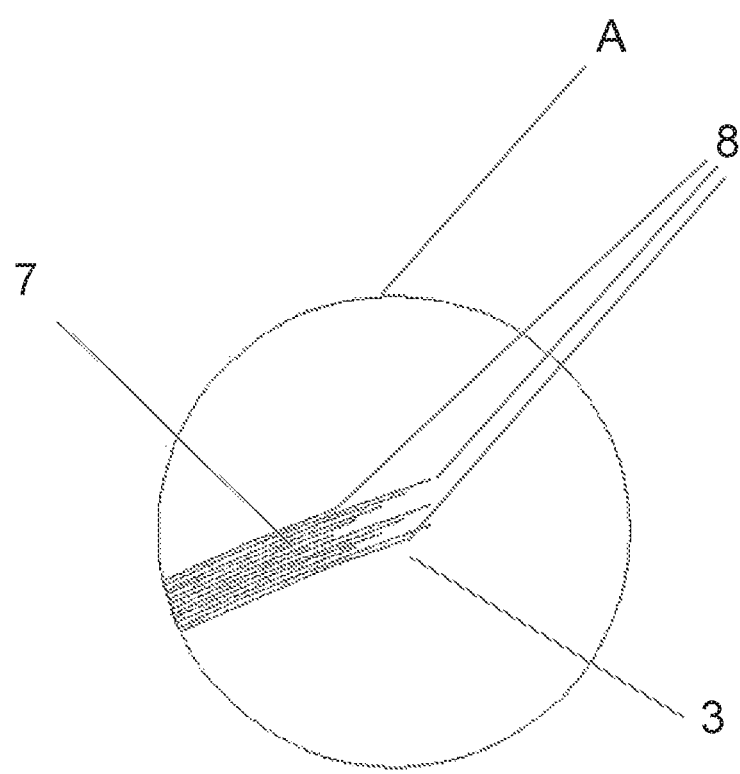
FIG. 2 is a plan view of an end-portion of the burst groove of FIG. 1.
Figure 3:
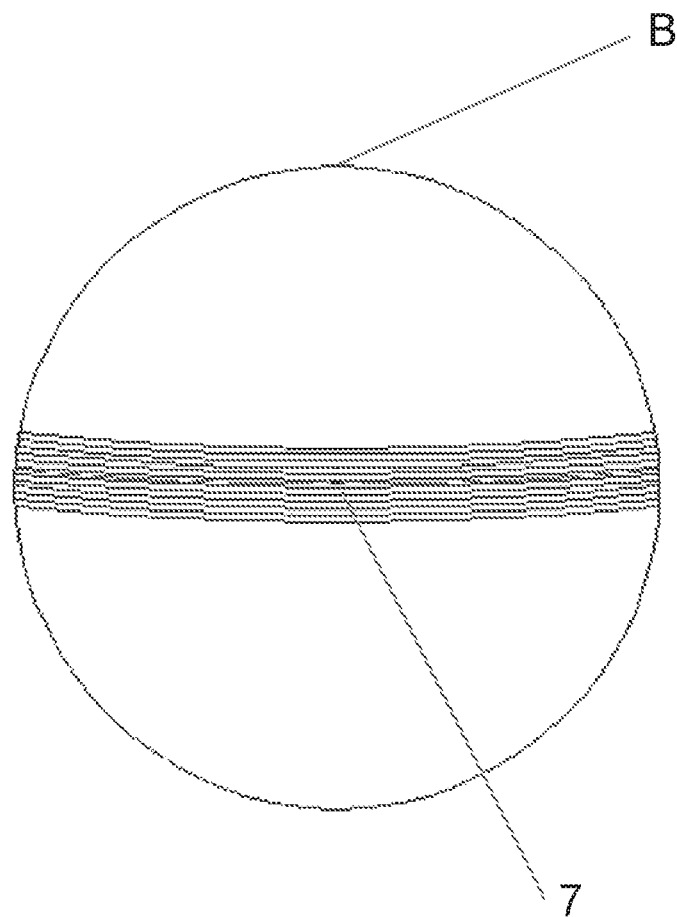
FIG. 3 is a plan view of a mid-portion of the burst groove of FIG. 1.

An end region A of the burst groove 2 is designated on FIG. 1. FIG. 2 shows a detailed view of end region A. A mid region B of the burst groove 2 is also designated on FIG. 1. FIG. 3 shows a detailed view of mid region B.

As described, FIG. 2 shows a detailed view of the end region A of the burst groove 2 corresponding to an initial stage of creating the burst groove 2 in the burst member 1. Twelve tracks 7 are designated on FIG. 2 by twelve respective lines. The tracks 7 are the routes along which a laser will pass during a first stage of the creation of the burst groove 2. The tracks 7 are parallel to one another, and are adjacent along portions of their lengths. Only the end portions of the tracks 7 in the vicinity of the first groove end point 3 are shown in FIG. 2. However, it will be appreciated that the tracks extend in a parallel and adjacent manner, following the path, generally to the second groove end point 4 (see FIG. 1), whereupon there are end portions of the tracks in the vicinity of the second groove end point 4.

Each track 7 has a pair of track end points: a first track end point at a first track end, and a second track end point at a second track end, the second track end being located opposite to the first track end. A track terminates at a track end point. In other words, a track end point is the location on the burst member at which the laser will cease to be incident on the burst member. In this way, a track end point defines a maximum extent of the movement of a laser along the track.

The position of the track end points of a plurality of tracks make up two track end point sets. A first track end point set, which is located in vicinity of first groove end 3, and a second track end point set, which is located in the vicinity of the second groove end 4.

In a track end point set (as shown in FIG. 2), the respective positions of the track end points 8 on the burst member 1 are offset from one another. If a hypothetical line is formed extending perpendicularly across the tracks 7 in the vicinity of the first groove end 3, then the distance of the individual end points 8 of the tracks 7 from the hypothetical line is not the same for all of the track end points 8 in the track end point set. Another way to describe this concept is to consider that there is no straight line that joins all of the track end points 8 in the track end point set and that is perpendicular to the tracks 7.

As shown in FIG. 2, the track end points 8 can have a repeating pattern of end point positions. In any case, it is advantageous that the end points of the tracks in an end point set are not directly adjacent to one another.

As described, FIG. 3 shows a detailed view of the mid region B of the burst groove 2 corresponding to an initial stage of creating the burst groove 2 in the burst member 1 (see FIG. 1). The twelve tracks 7 are designated on FIG. 3 by twelve lines. The tracks 7 are the routes along which a laser will pass during a first stage of the creation of the burst groove 2. The tracks 7 are parallel to one another, and are adjacent along all of their lengths shown in FIG. 3. It will be appreciated that the tracks extend in a parallel and adjacent manner, following the path, generally to the first groove end point and to the second groove end point 4 (see FIG. 1), whereupon there are end portions of the tracks in the vicinity of each groove end point, as described above.

In the embodiment shown in FIGS. 2 and 3, the spacing between the tracks is 0.05 millimeters. It will be appreciated that other track separations are equally possible. A suitable track spacing will depend on the width of the laser beam that is used to score along the tracks.

Figure 4:
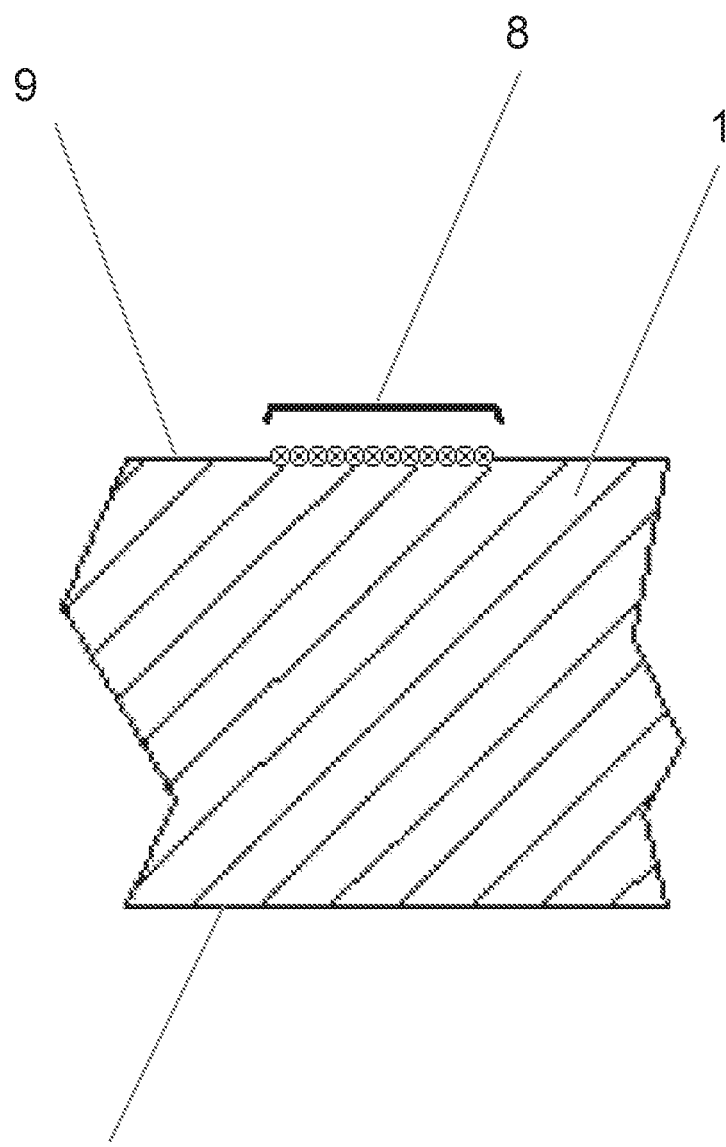
FIG. 4 is a cross-section of a portion of a burst member during the formation of a burst groove according to an embodiment of the present invention.

FIG. 4 shows a cross section through a burst member prior to beginning the method of creating a burst groove in a burst member according to the present invention.

A cross section through a burst member 1 is shown in FIG. 4. The burst member 1 is shown prior to the formation of a burst groove. The burst member 1 has an upwardly directed upper surface 9 and an opposite downwardly directed lower surface 10. The jagged edges shown on the left and right sides of the burst member are meant to indicate that the burst member extends in the left and right directions, however the cross-section is truncated at the jagged edges for clarity of illustration.

On the upper surface 9 of the burst member 1, twelve tracks 8 are indicated by the twelve crossed-circles. In this view of FIG. 4, the tracks 8 are running into, and out of, the page. Whilst the crossed-circles that are used to indicate the position of the tracks 8 are large, in reality the tracks are each a 1-dimensional line on the upper surface 9 of the burst member 1. As described, the tracks 8 merely designate the movement of the laser beam, and are not tangible objects in themselves. The twelve tracks 8 are adjacent and parallel to one another. In FIG. 4, no laser scoring of the burst member 1 has yet taken place.

FIGS. 5 to 11 show a sequence of successive stages during the creation of a burst groove in the burst member 1.

FIG. 5 shows the burst member 1 after the twelve tracks 8 shown in FIG. 4 have been laser scored by a corresponding plurality of laser beams 11, which are incident on the upper surface 9 of the burst member 1. It will be understood that a single laser could alternatively score the tracks 8 one-by-one. Such one-by-one laser scoring of the tracks 8 could be performed in any order. FIG. 5 shows the burst member 1 after the completion of a first stage.

The laser beams 11 have energized the material of the burst member 1 with a first energization width 12, which is indicated by the double arrow in FIG. 5. The energization of the material of the burst member 1 has caused the removal of some material from the upper surface 9 of the burst member 1. The removal of this material has formed a trough 13. The trough 13 has a generally flat base 14.

FIG. 6 shows the burst member 1 after ten tracks have been laser scored by a corresponding plurality of laser beams 15, which were incident on the base 14 of the trough 13 formed in the preceding stage (see FIG. 5). FIG. 6 shows the burst member 1 after the completion of a second stage.

The laser beams 15 have energized the material of the burst member 1 with a second energization width 16, which is indicated by the double arrow in FIG. 6. The second energization width 16 is less than the first energization width 12. During the second stage, the energization of the material of the burst member 1 has caused the removal of some material from the base 14 of the trough 13 shown in FIG. 5. The removal of this material has increased the depth of the trough 13, which again has a generally flat base 14.

FIG. 7 shows the burst member 1 after eight tracks have been laser scored by a corresponding plurality of laser beams 17 in a subsequent stage, which were incident on the base 14 of the trough 13 formed in the preceding stage (see FIG. 6). FIG. 7 shows the burst member 1 after the completion of a third stage.

The laser beams 17 have energized the material of the burst member 1 with a third energization width 18, which is indicated by the double arrow. The third energization width 18 is less than the second energization width 16. During the third stage, the energization of the material of the burst member 1 has caused the removal of some material from the base 14 of the trough 13 shown in FIG. 6. The removal of this material has increased the depth of the trough 13, which again has a generally flat base 14.

FIG. 8 shows the burst member 1 after six tracks have been laser scored by a corresponding plurality of laser beams 19 in a subsequent stage, which were incident on the base 14 of the trough 13 formed in the preceding stage (see FIG. 7). FIG. 8 shows the burst member 1 after the completion of a fourth stage.

The laser beams 19 have energized the material of the burst member 1 with a fourth energization width 20, which is indicated by the double arrow. The fourth energization width 20 is less than the third energization width 18. During the fourth stage, the energization of the material of the burst member 1 has caused the removal of some material from the base 14 of the trough 13 shown in FIG. 7. The removal of this material has increased the depth of the trough 13, which again has a generally flat base 14.

FIG. 9 shows the burst member 1 after four tracks have been laser scored by a corresponding plurality of laser beams 21 in yet another subsequent stage, which were incident on the base 14 of the trough 13 (see FIG. 8). FIG. 9 shows the burst member 1 after the completion of a fifth stage.

The laser beams 21 have energized the material of the burst member 1 with a fifth energization width 22, which is indicated by the double arrow. The fifth energization width 20 is less than the fourth energization width 20. During the fifth stage, the energization of the material of the burst member 1 has caused the removal of some material from the base 14 of the trough 13 shown in FIG. 8. The removal of this material has increased the depth of the trough 13, which again has a generally flat base 14.

FIG. 10 shows the burst member 1 after two tracks have been laser scored by a corresponding plurality of laser beams 23 in another subsequent stage, which were incident on the base 14 of the trough 13 (see FIG. 9). FIG. 10 shows the burst member 1 after the completion of a sixth stage.

The laser beams 23 have energized the material of the burst member 1 with a sixth energization width 24, which is indicated by the double arrow. The sixth energization width 24 is less than the fifth energization width 22. During the sixth stage, the energization of the material of the burst member 1 has caused the removal of some material from the base 14 of the trough 13 shown in FIG. 9. The removal of this material has increased the depth of the trough 13, which again has a generally flat base 14.

As the method according to the present invention has progressed through the above-described first to sixth stages, it will be appreciated that the energization width has progressively changed from a maximum with the first energization width 12 to a minimum at the sixth energization width 24. There has been a reduction in energization width with each stage in the creation of the burst groove.

Figure 11:
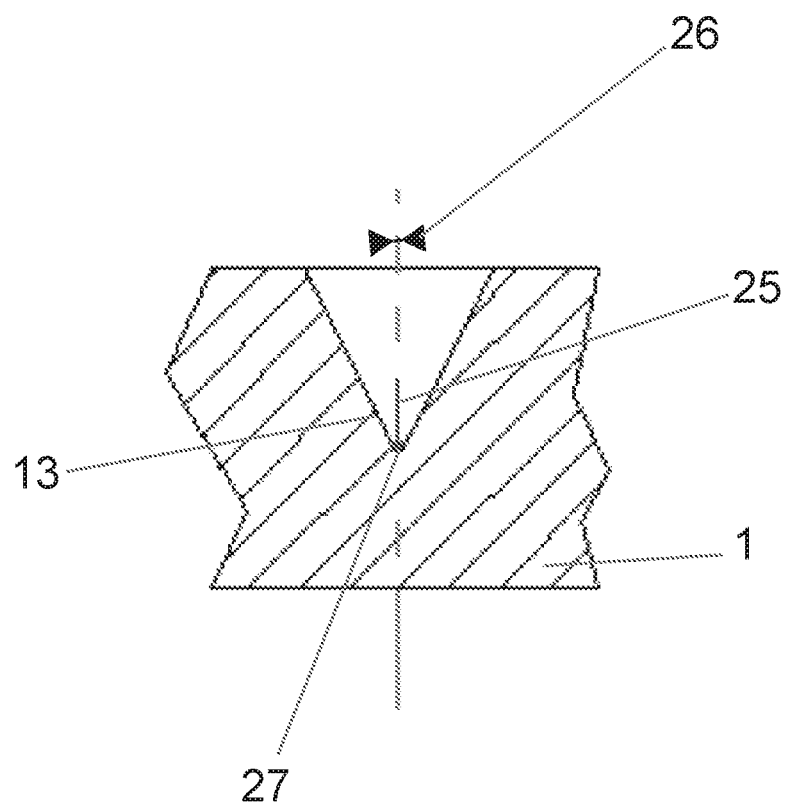
FIG. 11 is a cross-section of a portion of a burst member during an optional final stage during the formation of a burst groove according to an embodiment of the present invention.

FIG. 11 shows the burst member 1 after a single track has been laser scored by a single laser beam 25 in a final stage, which was incident on the base 14 of the trough 13 (see FIG. 10). FIG. 11 shows the burst member 1 after the completion of an optional seventh stage.

The laser beam 25 has energized the material of the burst member 1 with a seventh energization width 26, which is indicated by the double arrow. The seventh energization width 26 corresponds to the width of the single laser beam 25. The seventh energization width 26 is thus less than the sixth energization width 24. During the optional seventh stage, the energization of the material of the burst member 1 has caused the removal of some material from the base 14 of the trough 13 shown in FIG. 10. The removal of this material has increased the depth of the trough 13, which after the completion of the laser scoring during the seventh stage, has a pointed base 27.

Figure 12:
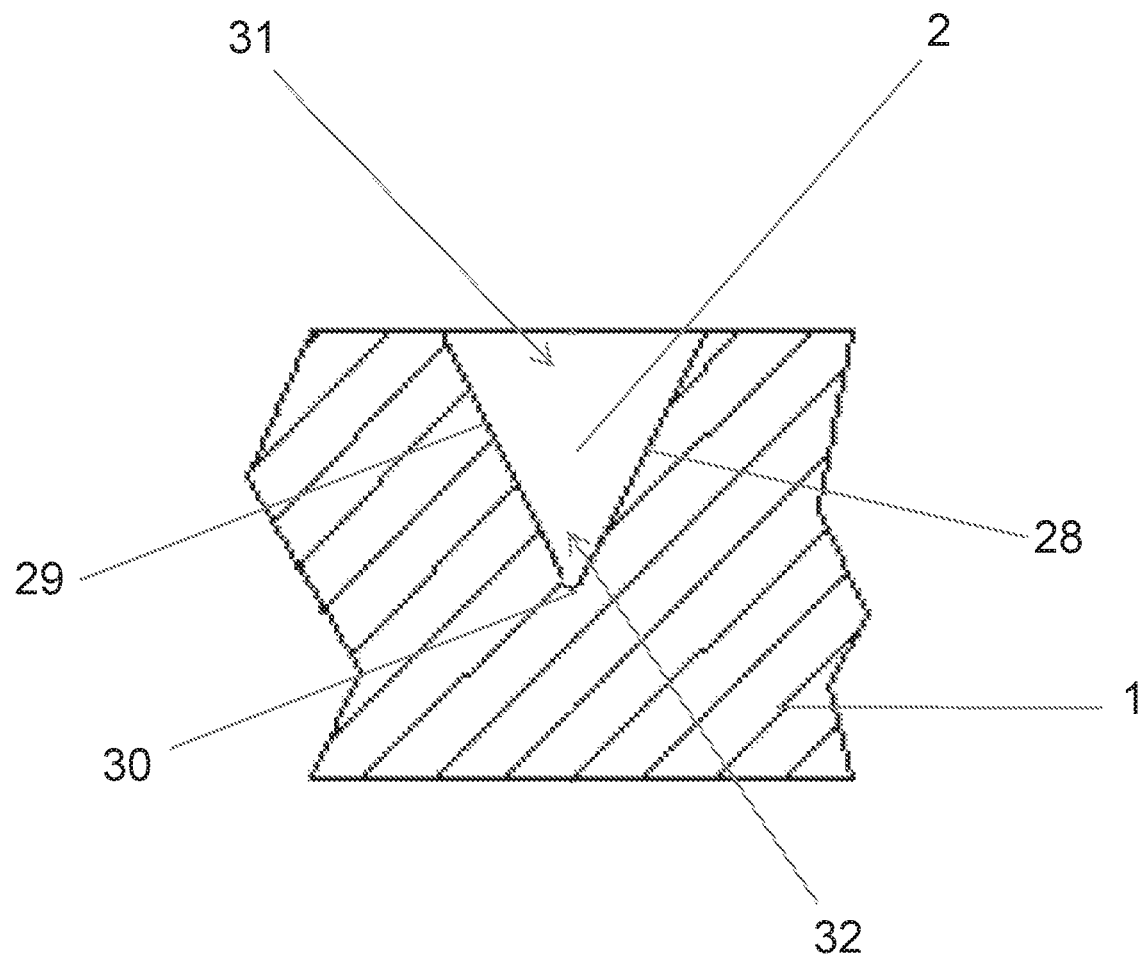
FIG. 12 is a cross-section of a portion of a burst member having a burst groove formed according to an embodiment of the present invention.

FIG. 12 shows a cross-sectional profile of a resulting burst groove 2 formed according to the embodiment of the method demonstrated in FIGS. 4 to 11. The burst groove 2 has two sloping sides 28, 29, which taper towards one another in the direction of the base 30 of the groove. The burst groove 2 has a relatively wide opening 31 that tapers to a relatively narrow terminating region 32. Although the sloping sides 28, 29 in FIG. 12 are shown as generally smooth-sided, it is equally possible that the sides of the burst groove formed according to the present invention could have one or more steps in the cross-sectional profile.

It will be appreciated that during each stage of the creation of the burst groove 2, the depth of the trough 13 is increased incrementally. As such, a lower power laser can be used for the laser scoring. By gradually increasing the depth of the trough 13 until the final desired depth of the burst groove 2 is formed, the final depth of the burst groove 2 can be accurately controlled.

As described above, during each stage of the creation of the burst groove 2, an energization width (12, 16, 18, 20, 22, 24) of the material of the burst member 1 is energized by the action of a laser beam. However, a laser beam has an incident energy profile. At the edges of that profile the incident energy from the laser may energize the material of the burst member 1, but to an insufficient degree to remove material, and therefore increase the depth. It will therefore be appreciated that there may be some degree of overlap between adjacent laser beams, such that material is successfully removed across the desired width for that stage. It will furthermore be appreciated that material may not be removed across the full energization width 12, 16, 18, 20, 22, 24. Because of the energy density profile of a laser tapering off towards the edges of the profile, it may be that the width of the material removed in a given stage is narrower than the energization width.

Each of the stages illustrated in FIGS. 4 to 10 involve laser scoring along a plurality of tracks. There is no requirement that these tracks should be scored simultaneously by a corresponding plurality of laser beams 11, 15, 17, 19, 21, 23. An alternative is that a single laser beam is used to sequentially laser score the tracks in during each stage. Using a single laser beam and scoring the tracks sequentially is particularly advantageous because it reduces manufacturing costs and complexity. The tracks of a given stage may be laser scored in any order. For example, they might be scored sequentially from left to right, or sequentially from right to left, for example. Alternatively, the tracks could be scored such that adjacent tracks are not scored directly after one another. It will be apparent that the material of the burst member 1 across the energization width 12, 16, 18, 20, 22, 24 does not need to be energized simultaneously.

As is clearly illustrated in FIG. 5, for example, the trough 13 formed in a single stage may have sloping sides. However, the profile of the trough may equally be square sided. It will be appreciated that if a square-sided trough is formed during each of a number of stages, then the final profile of the burst groove may be stepped.

It will be appreciated that where the edges of the energy density profile of the laser are incident on the burst member 1 there may be some energization of the material of the burst member 1, but the energization in that region may not be sufficient to remove material of the burst member 1. Consequently, the width of the trough may be slightly smaller than the energization width. Furthermore, the trough may not have a square-sided profile. In other words, the sides of the trough may not be vertical. For example, the sides of the trough 13 shown in FIG. 5 are angled to the vertical, such that the trough 13 has a flat-bottom, V-shaped cross-sectional profile.

Whilst the embodiment illustrated in FIGS. 4-10, and optionally FIG. 11, implements a gradual reduction in energization width, in embodiments, it is only important that there is an earlier stage of wider energization width, and a later stage with a narrower energization width. Furthermore, in the embodiment shown in FIGS. 4 to 10, the sequence of the number of tracks is 12 during the first stage (FIG. 4), followed by 10 in the second stage (FIG. 5), followed by 8 in the third stage (FIG. 6), followed by 6 in the fourth stage (FIG. 8), followed by 4 in the fifth stage (FIG. 9), followed by 2 in the sixth stage (FIG. 10). These numbers, both relative and absolute, may be different. This particular sequence is provided for example only.

For example, in some embodiments of the method there may be multiple stages with the same energization width and/or number of tracks as others.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method of creating a burst groove in a burst member, the groove following a path, wherein:
   the groove is created in a plurality of laser scoring stages which are performed in succession to thereby successively increase the depth of the burst groove during each stage;
   each laser scoring stage involving laser scoring the burst member along at least a portion of the path;
   wherein the laser scoring in each said stage involves laser-energizing a respective region of said burst member, and wherein each said region has a respective energization width measured perpendicular to said path, and wherein in at least one stage said energization width is smaller than the energization width in the immediately preceding stage, and wherein the smaller-width energization region in the later stage is formed entirely or partially within the higher-width, earlier stage, energization region.

2. A method according to claim 1, wherein said plurality of laser scoring stages includes a final stage which involves moving a single laser beam along a single laser track.

3. A method according to claim 1, wherein at least one of said plurality of laser scoring stages involves laser scoring the burst member by moving at least one laser beam along a plurality of adjacent and parallel laser tracks.

4. A method according to claim 1, wherein each of said laser scoring stages involves laser scoring the burst member by moving at least one laser beam along a respective plurality of adjacent and parallel laser tracks.

5. A method according to claim 3, wherein at least one of said laser scoring stages involves laser scoring the burst member by moving a single laser beam sequentially along said plurality of laser tracks.

6. A method according to claim 3, wherein at least one of said laser scoring stages involves laser scoring the burst member by simultaneously moving a respective laser beam along each of said plurality of laser tracks.

7. A method according to claim 3, wherein said plurality of laser scoring stages includes at least one stage which involves laser scoring the burst member along fewer tracks than in the immediately preceding stage.

8. A method according to claim 3, wherein said plurality of laser scoring stages includes at least one stage which involves laser scoring the burst member along fewer tracks than in each preceding stage.

9. A method according to claim 3, wherein said plurality of stages includes an initial stage and a plurality of subsequent stages, each of said subsequent stages involving laser scoring the burst member along fewer tracks than in the respective immediately preceding stage.

10. A method according to claim 3, wherein in at least one of said plurality of stages, the positions of the end points of the plurality of tracks are staggered relative to one another.

11. A method according to claim 1, wherein said plurality of laser scoring stages includes at least one stage in which said energization width is smaller than the energization width in each preceding stage.

12. A method according to claim 1, wherein said plurality of stages includes an initial stage and a plurality of subsequent stages, wherein in each of said subsequent stages said energization width is smaller than the energization width in the respective immediately preceding stage.

13. A method according to claim 1 involving the use of a single laser beam of constant dimensions.

14. A method according to claim 1 involving the use of a pulsed laser.

15. A method according to claim 1, wherein the burst groove has a cross sectional width that tapers from a maximum width at a surface of the burst member to a minimum width at the base of the groove.

16. A method according to claim 1, wherein the cross sectional shape of the groove has a flat-bottomed 'V'-shape.

17. A method according to claim 1, wherein the cross sectional shape of the groove has a 'V'-shape.

* * * * *